March 14, 1967 — H. L. SAXTON — 3,309,702
RADAR INDICATION SYSTEM
Filed May 22, 1946 — 3 Sheets-Sheet 1

INVENTOR.
HAROLD L. SAXTON
BY
ATTORNEY

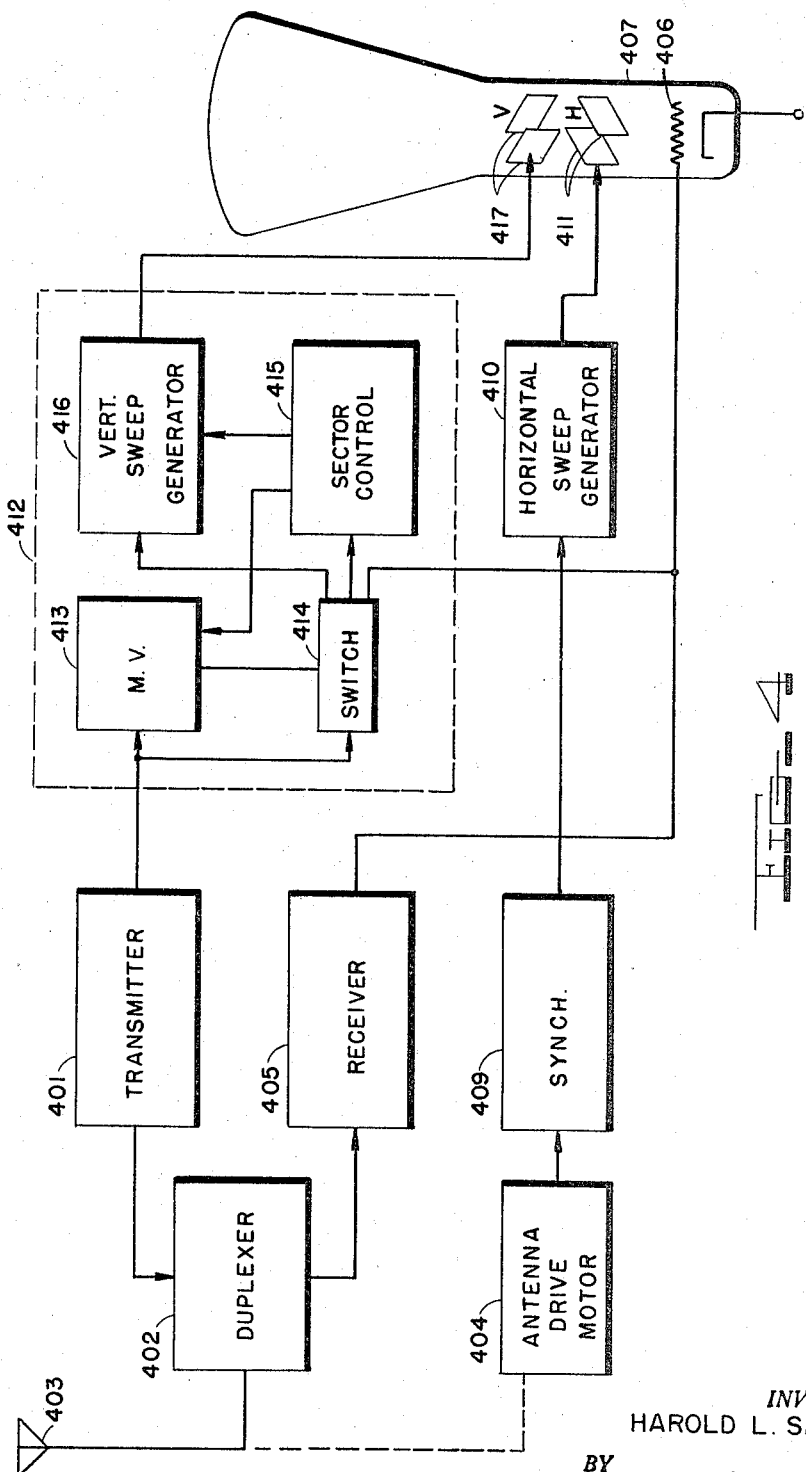

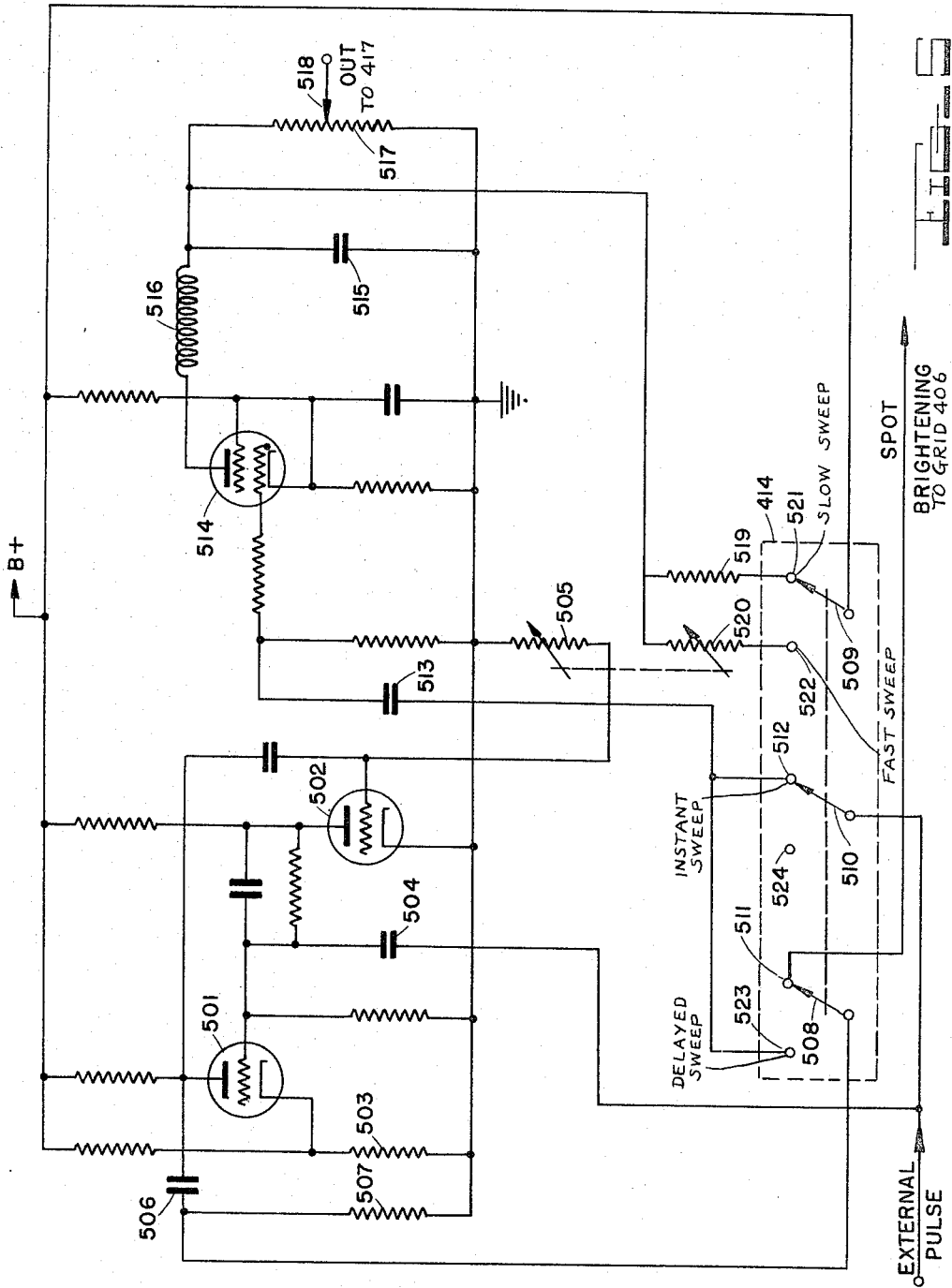

United States Patent Office 3,309,702
Patented Mar. 14, 1967

3,309,702
RADAR INDICATION SYSTEM
Harold L. Saxton, 7556 Broadview Road SE.,
Washington, D.C. 20022
Filed May 22, 1946, Ser. No. 671,490
6 Claims. (Cl. 343—11)

The invention described herein may be manufactured and used by or for the Government of the United States of America for governmental purposes without the payment of royalties thereon or therefor.

This invention relates in general to data presentation systems for echo ranging apparatus, and more particularly to a system for the visual presentation of objects detected by echo ranging apparatus in which the objects are indicated on a coordinate plot of their range and azimuthal positions relative to the position of the echo ranging apparatus.

Echo ranging devices, in general, have consisted primarily of a transmitter unit for generating and emitting pulsed energy at a selected repetition frequency, a receiver to pickup and detect reflections of the transmitted pulse energy or reradiations of energy from objects in the range of the device, and an indicator unit coupled with the receiver and in which the echoes or received signals are plotted on a time base generated on the fluorescent screen of a cathode ray tube to permit the indication or measurement of the range of the detected objects. Either a pair of directional radiators, one for radiating the pulsed energy into the propagating medium and one for receiving the energy, or a single radiator associated with a switching mechanism or duplexer is employed, in which case the single radiator is rendered useful for both transmission and reception of the pulses by coupling the radiator alternately to the transmitter and receiver.

Heretofore, the simultaneous display of the positions of a plurality of target objects within a certain area in the space surrounding the radiator of an echo ranging device has been effected by continuously rotating the directional radiator in a horizontal plane through the area desired to be scanned, and synchronizing with the radiator scanning movement and time of emission of energy either a plan position indicator, displaying the object positions on a polar coordinate indicator in which the azimuth of the target object is the angular coordinate and the range of the object the radial coordinate, or a range-versus-bearing rectangular plot displaying the range of the target as the vertical distance from a reference axis and the target bearing as the horizontal position of the target image relative to a reference axis.

In each type of indicator, the range of the target object is plotted on a linear time base synchronized with the triggering of the transmitter, the time base in the plan position indicator being swept linearly in a radial direction from the center of the screen of a cathode ray tube. This time base is synchronized with the directional orientation of the radiation beam to maintain continuously the angle subtended by the radial sweep or time base relative to a preselected radial reference line equal to the azimuthal angle of the beam emitted by the directional radiator. The plan position or polar coordinate display, assuming the radial sweep is substantially linear, gives an accurate, undistorted reproduction of the position and outline of the target objects in the space sector scanned.

In situations requiring large scale plan displays of the surrounding targets for station keeping, navigational or gunnery applications where highly accurate range and bearing information is required, the range-versus-bearing rectangular plot is commonly employed. However, since the vertical or range time bases, corresponding to the beam axis of the radiator as it is scanned, are all mutually parallel, the resultant display of the target or object area will be somewhat distorted compared to the actual relative positions and the sectional configuration of the objects described in the plane represented by the display known as the target aspect, since the angle made by a target image in the display with a vertical line on the indicator screen is not identical with the angle which the target makes with the beam axis of the radiator. It is desirable that the angles traced in the range-versus-bearing display should bear a constant relation and further that the display provide for maintaining a fixed relationship between the target angle presented and the real angles of the targets.

In the uncorrected range-versus-bearing display, with the vertical displacement of the range time base on the cathode ray tube screen corresponding to range from zero to maximum, there can be only one range at the most where the ratio of width of target image to its vertical displacement from the bottom is such as to show the correct target aspect. In order that the target aspect be correctly shown, the width of the target display should be to the distance of the target indication from the bottom of the display as the width of the azimuthal sector subtended by the target at maximum range is to the maximum range. This could be realized by either a wedge-shaped display or some properly proportioned time correction of the time base to compensate for the distortion occurring in the range-versus-bearing rectangular coordinate plot.

Accordingly, an object of this invention is to provide novel means for simultaneously indicating the range and azimuthal position of remote objects.

Another object of the invention is to provide novel means for simultaneously indicating in true aspect on a rectangular coordinate plot the range and azimuthal position of remote objects.

Another object of the invention is to provide novel means for visually displaying the range and bearing of objects in a selected sector in space in true aspect, in which the speed of the range time base is maintained inversely proportional to the means range of the sector.

Another object of the invention is to provide means for visually displaying the range and bearing of a plurality of objects in a selected sector in space in which the range coordinate of the target display is distorted in relation to the range of the selected sector by an amount necessary to render the display of the targets or objects substantially identical to the true sectional configuration of the objects described in the plane represented by the display.

Other objects, advantages and capabilities of the invention will become apparent from the following description taken in conjunction with the accompanying drawings showing only a preferred embodiment of the invention, in which:

FIG. 1 is a plan view of a sector of a plan position or polar coordinate display of objects in a preselected area in space;

FIGS. 2a and b are plan views of an expanded rectangular coordinate or range-versus-bearing display of the objects in the preselected area of FIG. 1.

FIGS. 3a and b are plan views of an expanded range-versus-bearing display of the objects shown in FIG. 2, showing the aspect correction of the images of the objects resulting from the present invention;

FIG. 4 is a block diagram of the aspect indicator forming the present invention in combination with an echo ranging system;

FIG. 5 is a schematic diagram of the sweep generator and range sector selector of the aspect indicator.

In the following detailed description, the invention is described in combination with a conventional radio echo ranging device for sake of illustration of a specific embodiment of the invention instead of a compressional wave system, but this is not to be construed as limiting application of the invention to combination with the class of devices shown. It will be apparent that the instant device is applicable for target image aspect correction for any detection system employing a visual rectangular coordinate display of the targets.

Figure 1:
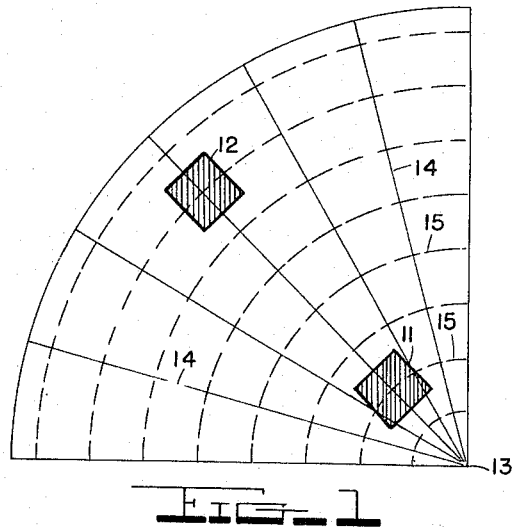
Figure 2A:
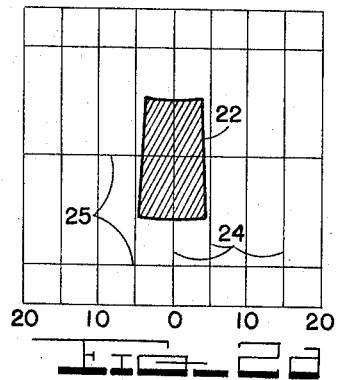

Referring now to FIGS. 1, 2a and b, and 3a and b showing the polar coordinate and rectangular coordinate displays of targets in a selected area in space, target objects 11 and 12 positioned in space relative to the position 13 of the radio echo detection device are displayed on the polar coordinate plot formed by the plan position display in their proper relative positions in space and target aspect, since the successive angular positions occupied by the radial sweep or time base in the polar coordinate display are identical to the angular positions assumed by the beam of pulsed radiation energy. In either the polar coordinate or the rectangular coordinate type of displays above mentioned, the visual indication of the targets at their proper ranges is effected by applying the received echoes or re-radiations of energy from the target to the intensity grid of the cathode ray tube in proper time relation with the time of emission of pulse energy from the transmitter. The electron beam generated in the cathode ray tube and impinging upon the fluorescent screen of the tube is normally held cutoff by the intensity grid in the absence of any return echoes. Reception of echoes or reradiations of energy in the radio echo detection device are amplified and applied to the intensity grid of the cathode ray tube to carry the voltage level of the grid above cutoff and permit the electron beam to generate a spot of light on the fluorescent screen of the tube. Since the electron beam is swept radially as a function of range and angularly in time as a function of the direction of the beam of emitted energy, the position of such spots of light will be in proper correspondence on the face of the cathode ray tube to the position of the targets in space relative to that of the echo detection device. Likewise, the outline or shape of the target will correspond properly to the shape of the target in a horizontal plane in space. Radial lines 14 and circular lines 15 form bearing and range calibration lines, respectively, and are generated by time controlled intensification of the range sweep.

Figure 2B:
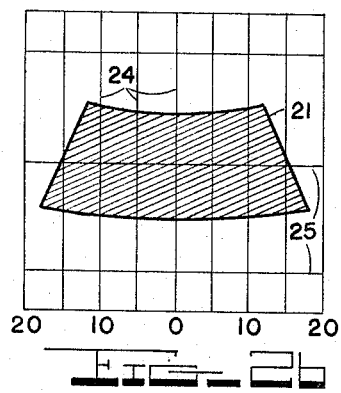

In FIGS. 2a and b the targets 21 and 22 correspond to targets 11 and 12 of FIG. 1. The vertical bearing calibration lines 24 formed by the vertical range sweep correspond to radial range sweep and bearing calibration lines 14 of FIG. 1. Likewise the horizontal range calibration lines 25 correspond to circular range calibration lines 15 of FIG. 1. Since the range time bases parallel to the lines 24 of FIGS. 2a and b correspond to the angular position of the beam of radiated energy and are mutually parallel in the rectangular coordinate plot, the variations in range of various points on the edge of the target at different bearing angles from the radiator give rise to a distorted image of the target, as shown in FIGS. 2a and b. The distortion of the target image is very large for wide angle targets at short ranges, as shown in FIG. 2b, and for substantially all targets produces an inaccurate image of both the shape of the target in the plane scanned and of the target angles. This gives rise to substantial errors in determining the range of a particular point on the target or in attempting recognition or identification of target from the image in the display.

It will be apparent that in order to display the targets in their proper aspect on a polar coordinate sector plot it is necessary either to plot the targets on a wedge-shaped coordinate grid in which the distance between the range sweeps at the top of the plot is considerably greater than the distance betwen such sweeps at the bottom of the plot, or the range sweep velocity must be increased for those range sectors near the source of radiated energy relative to the speed of the range trace for targets at distant ranges to expand the area of the target image in range and thus reduce the target aspect distortion. To effect target aspect correction, it develops that the rate of sweeping vertically must be determined from the range represented by the center of the target and must be inversely proportional to the magnitude of this range.

Figure 3A:
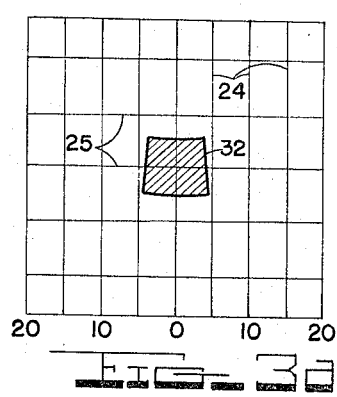
Figure 3B:
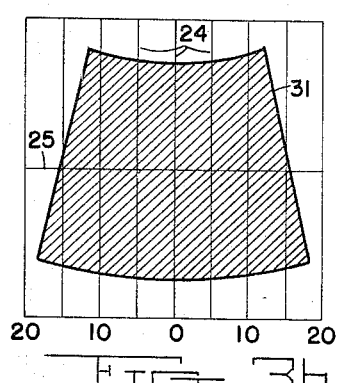

This relation is approximately obtained by the present invention. FIG. 3 shows a rectangular coordinate plot in which the vertical range sweep is expanded or controlled in proportion to the range of the sector selected to correct the target aspect as described below. The range expansion of the targets 11 and 12 of FIG. 1 renders the rectangular coordinate plot of the range sector of these targets in substantially true aspect as indicated by the corresponding targets 31 and 32 of FIGS. 3a and b.

Referring now to FIG. 4 showing the invention in combination with a radio echo detecting device of conventional form for purposes of illustration of the invention, there is provided a transmitter 401 for generating recurrent pulses of radiation energy, such as that disclosed in application Ser. No. 223,503, filed Aug. 6, 1938, by Robert M. Page, now Patent No. 2,541,092, issued Feb. 13, 1951, entitled, "Oscillator Generator." The output of this transmitted 401 is coupled through a duplexer 402, of the type disclosed in application Ser. No. 326,640, filed Mar. 29, 1940, by Robert M. Page et al., now Patent No. 2,688,746, to a directional radiator or antenna 403. This antenna 403 is mechanically coupled to an antenna drive motor 404 for continuously or selectively varying the angular orientation of the beam of emitted energy radiated from antenna 403 relative to a reference azimuthal direction in space. Likewise coupled to the duplexer 402 is a radio energy receiver 405. The function of the duplexer 402 is to couple the energy pulses generated by transmitter 401 to the antenna 403 while barring those pulses from the input to the receiver 405. However, when energy is received in the antenna 403 this energy is coupled by the duplexer 402 into the receiver input 405. Thus, the antenna 403 is alternately coupled to the transmitter 401 and 405, allowing antenna 403 to serve for both transmission and reception of the radiation pluses. The output of the receiver 405 comprising video pulses correspodning in time with the reception of the echoes of emitted energy through the radiator 403 is coupled to the intensity grid 406 of an electrostatic deflection cathode ray tube 407 of conventional design.

The angular orientation of the beam of energy radiated by radiator 403 is indicated on the screen of the cathode ray tube 407 as follows. A synchronizer 409 is coupled from the antenna drive motor 404 to sense the azimuthal bearing of the antenna by the position of the antenna drive motor. This synchronizer 409 is coupled to a hozizontal sweep generator 410 of conventional design to control the timing of the generation of the horizontal sweep. The sweep voltage generated by horizontal sweep generator 410 is coupled to the horizontal deflection plates 411 of the cathode ray tube 407 to deflect and sweep the electron beam generated in tube 407 in correspondence with the angular orientation of the beam of radiated energy.

This horizontal sweep generating system may, for example, comprise a uniformly wound circular potentiometer a direct current supply connected to two fixed taps on the winding 180° apart, and a movable arm mechanically coupled to the antenna drive motor and having a pair of electrical contacts mounted thereon engaging the potentiometer windings to connect the horizontal deflection plates of the cathode ray tube to two diametrically opposite points. It will be apparent that, with the angular movement of the contacts synchronized with that of the antenna, the initial position of the contact relative to the fixed taps and the amplitude of direct current voltage across the potentiometer may be adjusted to generate the desired azimuthal sweep.

Timing pulses of low amplitude but coincident in time with the radiation energy pulses are coupled from the transmitter 401 to the range sensing means 412, by which the selection of the desired range sector and the aspect correction are effected. This range sensing means 412 comprises a multivibrator 413 triggered by the timing pulses generated by transmitter 401 to effect the proper range time delay between the emission of the energy pulses and the initiation of the range sweep corresponding thereto. The transmitter timing pulses are likewise coupled through a selector switch 414 to a range sector control unit 415 controlling the time delay generated in the multivibrator 413. A vertical sweep generator 416 may be selectively coupled through selector switch 414 to the output of the multivibrator 413. The multivibrator 413 is designed to be triggered by the timing pulses generated in transmitter 401 to generate a sweep triggering pulse after a selected time delay interval determined by the sector control 415, the pulse being selectively coupled through switch 414 to the sweep generator 416 to initiate the expanded range sweep generated thereby. This expanded range sweep generated by vertical sweep generator 416 is coupled to the vertical deflection plates 417 of cathode ray tube 407 to produce the range time base on the screen of cathode ray tube 407. Switch 414 is designed to selectively couple the timing pulses from transmitter 401 either to the multivibrator 413 to trigger the sweep generator a delayed range interval after the transmission of the pulse energy or to couple the timing pulses from the transmitter 401 directly to the vertical sweep generator 416 to initiate the generation of the range sweep in coincidence with the emission of a pulse of energy. The sweep rate generated in sweep generator 416 is likewise controlled by the sector control 415 to display the targets from zero range up to the maximum range for which the echo detection device is designed or to display a small expanded range sector, both occupying the same area on the screen of the cathode ray tube 407.

With the selector switch 414 in a position to couple the timing pulses from transmitter 401 directly to the sweep generator 416 to initiate the range sweep in coincidence with the emission of a transmitted pulse, a display similar to that shown in FIG. 2a or b is generated, but in which the area occupied by the target images 21 and 22 is considerably smaller. It will be apparent therefore that the aspect distortion of the targets, appearing in their true aspect at 11 and 12 in FIG. 1, will be even greater than those of targets 21 and 22 in FIGS. 2a and b due to the range variations occurring at various positions along the leading and trailing edges of the targets when these ranges are plotted along mutually parallel axes rather than wedge-shaped or radially diverging axes.

When the range selector switch 414 is positioned to couple the transmitter timing pulses to the multivibrator 413 and the range sweep initiating pulses from the output of multivibrator 413 to the sweep generator 416, the sector control 415, in determining the time delay generated in multivibrator 413 between the emission of the transmitted pulse and the initiation of the range sector sweep, simultaneously varies the sweep rate of the range sector sweep in sweep generator 416 to render the sweep rate inversely proportional to the range at the center of the sector display. Thus, the velocity of the vertical range sweep for the target object 11 is rendered considerably greater than the vertical sweep velocity of the display for target 12. The duration of time over which echo signals are received from the targets for a given pulse of energy, due to the range difference between the leading and trailing edges of each target, for the faster sweep in the display 3b of target 11 will render the vertical trace of target image 31 considerably expanded on the indicator screen, relative to its trace in the uncorrected display of FIG. 2b.

Reference will now be had to FIG. 5 in which are shown the specific circuit details by which the functions of the range selector and aspect correction means 412 are effected. Multivibrator 413 is formed of triode vacuum tubes 501 and 502 intercoupled as a conventional grid-plate coupled multivibrator. Triode 501 is normally cut off, its cathode being biased positive relative to its grid due to the voltage drop across resistor 503 between its cathode and ground. Both the cathode and grid of triode 502 are returned to ground, holding this tube in a normally conducting state. When the potential on the grid of 501 is carried above cut off, tube 501 will start conducting and regenerative action will carry it further into the conduction region while shutting off conduction in the other tube 502 by means of negative grid bias. This state, with triode 501 conducting and triode 502 cut off, will then be maintained until the charge on the grid of triode 502 leaks off, at which time tube 502 again starts conducting and triode 501 is cut off by regenerative action.

An external synchronizing signal, such as the timing pulses occurring in time coincidence with the emission of the transmitted energy pulse from transmitter 401, is coupled through condenser 504 to the control grid of triode 501. This positive synchronizing pulse when applied to the tube of 501 carries the grid into conduction as described above and generates at the plate of tube 501 a negative pulse of a duration determined by the discharge path time constant of the control grid of triode 502. This time constant is controlled by variable resistor 505 coupled between the grid of 502 and ground. The voltage waveforms at the plate of triode 501, comprising the negative pulses of a duration determined by the setting of variable resistor 505, are coupled through a differentiating network composed of condenser 506 and resistor 507 to switch contact arm 508 in switch 414. The switch 414 consists of two transfer contacts and one make-break contact, indicated at switch contact arms 508, 509 and 510 respectively, all of the contact arms being ganged together to operate in unison, to switch the range selector and sweep generator system from a full range condition to a range sector condition.

The output voltage waveform coupled from the differentiating circuit composed of condenser 506 and resistor 507 comprises a negative pulse of very short duration coincident in time with the external initiating pulse and a positive pulse coincident in time with the trailing edge of the pulse generated on the plate of triode 501 and thus delayed with respect to the time occurrence of the external initiating pulse by an amount determined by the setting of resistor 505. With the switch 414 in the right hand position shown, in which the system is conditioned to generate a range sweep voltage to display targets from zero to the maximum range of the radio echo detection system, the delayed sweep triggering pulses are coupled through arm 508 and contact 511 to the spot brightening or intensity grid, such as grid 406 on cathode ray tube 407 shown in FIG. 4. The external synchronizing pulse is coupled directly to the arm 510 in the switch 414. With the contact arm 510 in the right hand position shown in FIG. 5, the external initiating pulse is coupled from contact 512 through a coupling condenser 513 to the grid of gas tetrode thyratron 514 forming the trigger tube for sawtooth generator 416. Coupled across gas tetrode 514 is the storage condenser 515. An inductance 516 is coupled into the series discharge circuit of condenser 515 between 515 and the gas tetrode 514 to cause the discharge of condenser 515, when the tetrode is triggered, to continue until the voltage across condenser 515 is less than that required to sustain conduction in tube 514. A resistor 517 is coupled across the storage condenser 515 and has a movable tap 518 from which a selective amplitude of sawtooth voltage may be tapped off. The charging circuit for condenser 515 includes either resistor 519 or variable resistor 520 forming alternative charging paths to the condenser. Resistor 519 or 520 may be selectively inserted into the circuit or charge path of condenser 515 by coupling through contact 521 or 522, to which they are respectively connected, and contact arm 509 connected to the plate voltage supply.

In the full range or right hand position of switch 414, the time constant of the charging circuit of condenser 515 is determined by the capacity of condenser 515 times the effective parallel resistance of resistor 519 and resistor 517.

With switch 414 in the right hand position, the external initiating pulses coupled through contact arm 510 and contact 512 to the gas tetrode 514 trigger the gas tetrode, discharging condenser 515 through inductor 516 and tube 514 and initiating a new charging cycle for the condenser 515 during which charging cycle a sawtooth voltage waveform is generated across the resistor 517 to be applied to the vertical deflection plates of cathode ray tube 407. After some time delay interval following the initiation pulses, the positive pulses coupled from the differentiating circuit comprising condenser 506 and resistor 507 are coupled through the switch 414 to the spot brightening grid of the cathode ray tube 407, thus producing horizontally across the zero-to-maximum range rectangular coordinate plot a bright line comprising a series of such pulses, their range position being determined by the setting of resistor 505. The range position of this bright line determines the initial range of the range sector to be displayed with aspect correction.

Placing the switch 514 in the left hand position to generate the expanded range sector display, switch contact arm 508 couples the delay trigger pulse from differentiating circuit 506, 507 through contact 523 to the control grid of gas tetrode 514 to trigger the gas tetrode in delayed time relationship with the occurrence of the external initiating pulses. The external synchronizing pulses are decoupled from the input to the gas tetrode 514 by transfer of the switch contact 510 to the open contact 524. Switch contact arm 509 transfers the charging path for charging condenser 515 from the fixed resistor 519 to the variable resistor 520 connected to contact 522 and ganged with the delay control resistor 505.

The ganged variable resistors 505 and 520, controlling the time delay of a multivibrator stage 412 and the sweep rate of sweep generator 416 respectively, are intercoupled to maintain continuously a direct proportionality between the setting of the two resistors. Increasing the resistance of resistor 505 increases the time constant of the discharge path of the grid of triode 502 in the multivibrator 416, increasing the duration of the negative pulse generated on the plate of triode 501 and the delay of the positive pulse coupled from the differentiating circuit, while the corresponding variations of resistor 520 increases the time constant of the charging path of condenser 515, thus reducing the slope of the sawtooth voltage waveform produced across the condenser 515.

It should be apparent that the proper proportioning of the sweep speed and the range sector for the display can be effected if the time constant of the charging path of charging condenser 515 is properly chosen for one setting of the variable resistor 520 such that the ratio of the width of the target image in the display to the distance of the target image from the bottom of the display is equal to the ratio of azimuthal sector subtended by the target at maximum range to the maximum range.

By the above means, a substantially accurate display image of the outline of the targets at various positions in space relative to that of the echo detection device can be effected substantially without distortion by providing an expanded range sector display and proportioning the speed of the vertical or range sweep to the range of the target objects and the horizontal azimuthal angle subtended thereby to obtain an accurate reproduction of the true target aspect. Highly accurate range and bearing readings may be determined from such a display for gunnery and navigational purposes, since electronic range calibration lines in the display will be separated due to variations in sweep speed by an amount proportional to the expansion in range of the target display.

Various modifications may be made in the invention without departing from the spirit and scope thereof, and it is desired, therefore, that only such limitations shall be placed thereon as are imposed by the prior art and are set forth in the appended claims.

What is claimed is:

1. In a system of echo detection wherein a given field in space is scanned by a beam of periodically emitted energy and reradiations of said energy from an object within said field are received, means providing a plot of the range and direction of said object comprising, in combination, a cathode ray tube, first time base generating means, means synchronizing said first generating means with the scanning of said beam, second time base generating means, means operative to vary the trace velocity of the second time base in inverse relation to the range of said objects, means coupling both of the time bases to said tube to produce mutually perpendicular time base loci on the screen of said tube, and means operative on receiving reradiations of energy to effect an indication on said time base loci.

2. In a system of echo detection wherein a given field in space is scanned by a beam of periodically emitted energy and reradiations of said energy from an object within said field are received, means providing a plot of the range and azimuth of said objects comprising, in combination, a cathode ray tube, first time base generating means, means synchronizing said first generating means with the scanning of said beam, second time base generating means, adjustable delay means operative to delay the initiation of said second generating means, means synchronized with the delay means to vary the trace velocity of the second time base in inverse relation to the range of said objects, means coupling both of the time bases to said tube to produce mutually perpendicular time base loci on the screen of said tube, and means operative on receiving reradiations of energy to effect an indication on said time base loci.

3. In a system of echo detection wherein a given field in space is repeatedly scanned by a beam of periodically emitted energy and reradiations of said energy from an object within said field are received, means for providing a plan indication of the range and azimuth of said object comprising, in combination, means to produce a spot of light on a screen, means to move said spot of light in a horizontal direction along said screen while maintaining the position of said spot continuously proportional to the horizontal directional component of said beam, means to move said spot of light in a vertical direction at a velocity bearing a predetermined time relation with the speed of propagation of said energy, adjustable delay means to introduce a delay between the emission of said energy and the initiation of said vertical spot movement, means synchronized with said delay means to vary the velocity of said vertical spot movement in inverse relation to the delay introduced, and means to increase the intensity of said spot of light when said spot of light is in a horizontal position corresponding to the azimuth of said object and a vertical position corresponding to the range of said object.

4. In a system of echo detection, in combination, means to produce high-frequency electromagnetic oscillations, means to modulate said oscillations with a succession of pulses, means to radiate said modulated oscillations in a narrow beam of electromagnetic waves, means to scan said narrow beam through a predetermined field in space, a screen, means to produce a spot of light on said screen, means moving said spot of light horizontally across said screen in synchronism with the scanning movement of said beam, means generating a vertical deflection of said spot continuously proportional to the time lapse following the radiation of said pulses, adjustable delay means operative to introduce a time delay between the radiation of a pulse and the initiation of the corresponding vertical deflection of the spot, means synchronized with said delay means to vary the velocity of deflection of said spot vertically in inverse relation with the time delay introduced, means to receive signals reflected from an object within said field, means responsive to the received signals to increase the intensity of said spot of light such that the vertical position of the intensified spot corresponds to the range of said object and the horizontal position of the intensified spot corresponds to the azimuth of said object.

5. In a system of echo detection wherein a given field in space is repeatedly scanned by a beam of periodically emitted energy and reradiations of said energy from an object within said field are received, means generating a plot of the position of said object in a preselected space sector intercepted by said beam comprising, in combination, means to produce a spot of light on a screen, means to move said spot of light in a horizontal direction across said screen by application to said spot of a deflecting force whose magnitude increases linearly in proportion to the movement of the beam of emitted energy through one revolution of the scanned sector whereby said spot occupies continuously a position corresponding to the horizontal directional component of said beam, means to move said spot of light in a vertical direction across said screen, said means including a linearly increasing force whose magnitude is continuously proportional to the time lapse following the emission of said energy, means operative to introduce a selectable delay between the emission of said energy and the initiation of said vertical spot movement, means synchronized with said delay means to vary the rate of increase of said linearly increasing force in inverse relation with the time delay introduced, means responsive to the receipt of reradiation of energy from said object to intensify said spot such that the vertical position of the intensified spot corresponds to the range of said object and the horizontal position of the intensified spot corresponds to the azimuth of said object.

6. In an echo detection system wherein a given field in space is repeatedly scanned by a beam of periodically emitted energy and reradiations of said energy from objects within said field are received and applied to sensing means to visually indicate the range and azimuth of said objects on a rectangular coordinate plot, means for applying correction to said plot to offset distortion due to conversion of polar coordinate into rectangular coordinates and render the indication of said objects substantially identical to the true aspect of said object in the plane scanned by said beam comprising, a first time base sweep generator synchronized with the scanning movement of said beam and forming one coordinate of said plot, a second time base sweep generator bearing a predetermined time relation with the speed of propagation of said energy and forming the other coordinate of said plot, adjustable delay generator means operative to initiate operation of the second time base sweep generator a selected time after the emission of said energy, means synchronized with the delay means to vary the velocity of sweep of said second time base sweep generator in inverse relation to the delay generated in said delay means, and means coupling each of said time base sweep generators to said sensing means to form the axes of said rectangular coordinate plot.

References Cited by the Examiner
UNITED STATES PATENTS

| | | | |
|---|---|---|---|
| 2,419,205 | 4/1947 | Feldman | 343—11 |
| 2,421,747 | 6/1947 | Englehardt | 343—11 |
| 2,426,201 | 8/1947 | Grieg | 343—13 |
| 2,480,208 | 8/1949 | Alvarez | 343—11 |
| 2,538,800 | 1/1951 | Ranger | 343—11 |
| 2,546,970 | 4/1951 | Busignies | 343—11 |

CHESTER L. JUSTUS, *Primary Examiner.*

SIMON YAFFEE, ARTHUR GAUSS, *Examiners.*

W. W. BURNS, A. K. GEER, R. D. BENNETT,
*Assistant Examiners.*